United States Patent [19]  [11]  4,414,363
Akita et al.  [45]  Nov. 8, 1983

[54] RUBBER COMPOSITION

[75] Inventors: Shuichi Akita; Takeshi Chida, both of Kamakura; Hiroyuki Watanabe; Akio Ueda, both of Yokohama, all of Japan

[73] Assignee: Nippon Zeon Co. Ltd., Tokyo, Japan

[21] Appl. No.: 388,973

[22] Filed: Jun. 16, 1982

[51] Int. Cl.³ .......................... C08L 9/00; C08L 47/00
[52] U.S. Cl. ...................................... 525/237; 525/236
[58] Field of Search ................................ 525/236, 237

[56] References Cited

U.S. PATENT DOCUMENTS

| | | | |
|---|---|---|---|
| 3,365,416 | 1/1968 | Vittorelli et al. | 525/237 |
| 3,919,130 | 11/1975 | Cohen | 525/237 |
| 4,220,564 | 9/1980 | Tanimoto et al. | 525/237 |
| 4,321,168 | 3/1982 | Ueda et al. | 525/236 |
| 4,323,485 | 4/1982 | Ahagon et al. | 525/237 |
| 4,342,670 | 8/1982 | Ahagon et al. | 525/236 |
| 4,350,621 | 9/1982 | Bond et al. | 525/237 |

Primary Examiner—J. Ziegler
Attorney, Agent, or Firm—Sherman & Shalloway

[57] ABSTRACT

A rubber composition comprising as main components (1) at least one rubber having a glass transition temperature of from $-45°$ C. to $0°$ C. and selected from the group consisting of an isoprene-butadiene copolymer rubber and polyisoprene rubber and (2) at least one rubber selected from the group consisting of natural rubber and cis-1,4-polyisoprene rubber having a cis-1,4-linkage content of at least 90 mole %, said composition having a value, defined by the following formula, of at least 10, $$[(R-53)+(S-100)]$$

wherein R is a rebound (%) measured at $51°$ C. by a Dunlop Tripso meter for a vulcanized product of said rubber composition, and S, as defined in the specification, is a wet skid resistance index on a road surface defined by ASTM E-303-74 which is determined at $19°$ C. by a portable skid tester for a vulcanized product of said rubber composition.

10 Claims, No Drawings

RUBBER COMPOSITION

This invention relates to a novel rubber composition having an improved rebound and wet skid resistance and comprising an isoprene-butadiene copolymer rubber and/or polyisoprene rubber having a specified glass transition temperature and natural rubber and/or cis-1,4-polyisoprene rubber as main components.

In an attempt to decrease the fuel consumption of automobiles and to secure their safety, it has been strongly desired in recent years to reduce the rolling resistance, and increase the wet skid resistance, of automobile tires. Generally, these two properties are thought to depend greatly on the dynamic viscoelastic properties of the rubber materials of tire treads, and also known to be inconsistent with each other (see, for example, Jidosha Gijutsu (Automobile Technology), vol. 32, pp. 417-420, 1978; and Transactions of I.R.I., vol. 40, pp. 239-256, 1964).

To reduce the rolling resistance of a tire, it is necessary to form a tire tread from a rubber material having a high rebound. In view of the running condition of an automobile, the rebound must be evaluated at a temperature of from 50° C. to about 70° C. On the other hand, to increase the wet skid resistance of a tire, which is a wet road grip and is important from the standpoint of safety, the tire tread should be formed from a rubber material which undergoes a large energy loss as frictional resistance generated when a tire is allowed to slide on a road surface with braking. In order to balance these two viscoelastically inconsistent properties, a mixture of a styrene-butadiene copolymer rubber having a combined styrene content of 15 to 25% by weight and polybutadiene rubber having a 1,2-linkage content of not more than 30 mole% has previously been used as a rubber material for automobile tire treads. However, this type of material is unable to meet the recent high level of requirements for a balanced combination of these two properties, and it has been desired to develop a new rubber material.

With this background, the present inventors extensively investigated the development of a rubbery material having an excellent rebound and wet skid resistance, and found that a rubber material comprising substantially amorphous polybutadiene rubber containing a limited high proportion of 1,2-linkages, polybutadiene rubber having a low 1,2-linkage and natural rubber as main components can satisfy the aforesaid two properties. This discovery was applied for a patent (U.S. Pat. No. 4,224,197).

On continued investigations, the present inventors have now found that a composition prepared by mixing a rubbe obtained by copolymerizing 1,3-butadiene and isoprene or a polyisoprene rubber obtained by polymerizing isoprene alone and having a glass transition temperature (Tg for short) within a specified range, with natural rubber and/or cis-1,4-polyisoprene rubber having a cis-1,4-linkage content of at least 90 mole% has a markedly improved rebound and wet skid resistance which cannot be anticipated from the rubber composition disclosed in the above-cited U.S. patent.

Thus, according to this invention, there is provided a rubber composition comprising as main components (1) at least one rubber having a glass transition temperature of from −45° C. to 0° C. and selected from the group consisting of an isoprene-butadiene copolymer rubber and polyisoprene rubber and (2) at least one rubber selected from the group consisting of natural rubber and cis-1,4-polyisoprene rubber having a cis-1,4-linkage content of at least 90 mole%, said composition having a value, defined by the following formula, of at least 10, $$[(R-53)+(S-100)]$$

wherein R is a rebound (%) measured at 51° C. by a Dunlop Tripso meter for a vulcanized product of said rubber composition, and S is a wet skid resistance index on a road surface defined by ASTM E-303-74 which is determined at 19° C. by a portable skid tester for a vulcanized product of said rubber composition.

The rubber (1) having a Tg of from −45° C. to 0° C., i.e. the isoprene-butadiene copolymer rubber or polyisoprene rubber, is an essentially amorphous rubber having a major proportion of 1,2-linkages and/or 3,4-linkages which is obtained by polymerizing a mixture of 1,3-butadiene and isoprene or isoprene alone at a temperature of −80° C. to 100° C. in a hydrocarbon solvent in the presence of an organolithium compound, etc. as a catalyst and a polar compound such as ethers or amines. The isoprene-butadiene copolymer rubber includes, for example, a homogeneous random copolymer rubber, a random copolymer rubber containing a minor proportion of butadiene or isoprene blocks, and a block copolymer rubber. The rubber (1) has a Mooney viscosity ($ML_{1+4}$, 100° C.) of preferably 20 to 200, more preferably 30 to 150. If its Mooney viscosity is less than 20, the mechanical properties, such as tensile strength, of the resulting composition are inferior. If it exceeds 200, the blendability of the rubber (1) with the rubber (2) is reduced, and the resulting rubber composition is degraded in tensile strength, etc.

If the Tg of the rubber (1) is less than −45° C., the wet skid resistance of a vulcanized product of the resulting rubber composition cannot be improved. If it exceeds 0° C., not only the rebound of the vulcanized product but also its wet skid resistance cannot be improved. Thus, in either case, it is impossible to provide a rubber composition having a balanced combination of high levels of rebound and wet skid resistance as represented by a [(R−53)+(S−100)] value of at least 10. The Tg range is preferably from −40° C. to −15° C., more preferably from −35° C. to −20° C.

The amount of combined isoprene in the isoprene-butadiene copolymer rubber can be varied freely within the above-specified range of Tg. In order to obtain a copolymer rubber which is improved greatly in the aforesaid two properties over polybutadiene having a high 1,2-linkage content, the amount of combined isoprene is preferably at least 5% by weight, more preferably at least 10% by weight.

Needless to say, rubbers comprising the rubber (1) and a small amount of another copolymerizable monomer such as styrene as copolymer units are to be included within the scope of this invention so long as they do not deviate from the spirit and essence of this invention.

The rubbers (2) in the composition of this invention, i.e. natural rubber and cis-1,4-polyisoprene rubber having a cis-1,4-linkage content of at least 90 mole%, can be used either singly or as a mixture.

The ratio between rubber (1) and rubber (2) suitable for the preparation of the composition of this invention having a [(R−53)+(S−100)] of at least 10 differs according to the Tg of the rubber (1). Usually, a preferred composition in accordance with this invention contains 25 to 75% by weight of the rubber (1) and 75 to 25% by weight of the rubber (2).

A part of the rubber (2) may be replaced by a diene-type rubber such as polybutadiene rubber and styrene-butadiene copolymer having a 1,2-linkage content of not more than 30 mole% in an amount which does not impair the balance between rebound and wet skid resistance in order to improve the abrasion resistance of the composition of this invention.

All or some of the rubber components used in this invention can be used as oil-extended rubbers.

The rubber composition of this invention is formed into a rubber compound by kneading with various compounding agents used in the rubber industry, such as various grades of carbon black, process oils, zinc oxide, stearic acid, sulfur, vulcanization accelerators, and oxidation inhibitors, by using mixers usually employed in the rubber industry, such as a roll or a Banbury mixer. The rebound (%) of a vulcanized product obtained by vulcanizing this rubber compound, which is measured at 51° C. by means of a Dunlop Tripso meter, is R as described hereinabove. A value obtained by dividing the wet skid resistance value of the vulcanized product measured by a portable skid tester at 19° C. on a road surface defined in ASTM E-303-74, by the wet skid resistance value of the vulcanized styrene-butadiene copolymer rubber compound (sample No. 1 in Example 1), and multiplying the quotient by 100 is the aforesaid resistance index S.

Tg, as used herein, is a value measured by using a differential scanning calorimeter (DSC).

Since the rubber compositions of this invention has high levels of rebound and wet skid resistance, it is especially suitable as a rubber material for automobile tire treads. It can also be used in bicycle tires, shoe sales, beltings, floor materials, etc.

The following Example specifically illustrates the present invention.

EXAMPLE

One hundred parts by weight of raw material rubbers were kneaded with the various compounding agents shown in Table 1 by means of a Brabender-type mixer having a capacity of 250 ml to obtain various rubber compounds. The amounts of sulfur and vulcanization accelerators were such as to provide an optimally vulcanized condition for each of the compounds.

These rubber compositions were press-cured at 160° C. for 10 to 30 minutes to prepare samples.

TABLE 1

| | |
|---|---|
| Raw material rubbers (see Tables 2 to 5) | 100 parts by weight |
| Zinc oxide No. 3 | 3 parts by weight |
| Stearic acid | 2 parts by weight |
| Carbon black (HAF) | 50 parts by weight |
| High aromatic oil | 5 parts by weight |
| Sulfur | varying amounts |
| Vulcanization accelerator (N—oxydiethylene-2-benzo-thiazol sulfenamide) | varying amount |
| Antioxidant(N—phenyl-N—isopropyl-p-phenylenediamine) | 1 part by weight |

Polybutadiene having a high 1,2-linkage content, a butadiene-isoprene copolymer rubber and polyisoprene rubber having the properties shown in Table 2 were prepared in accordance with usual solution-polymerization techniques by polymerizing 1,3-butadiene and/or isoprene at a temperature of 40° to 90° C. in a cyclohexane solvent in the presence of a n-butyl lithium as a catalyst and diethylene glycol dimethyl ether as a polar compound.

Table 2 also gives the properties of commercially available cis-1,4-polyisoprene rubber and styrene-butadiene copolymer rubber.

TABLE 2

| Types of rubber | | Composition of copolymer rubber (butadiene/ isoprene) | Mooney viscosity (ML$_{1+4}$, 100° C.) | Tg (*1) (°C.) | Contents of linkages (mole %) (*2) | | |
|---|---|---|---|---|---|---|---|
| | | | | | 1,2 | 1,2 + 3,4 | 1,4 |
| Polybutadiene having a high 1,2-combined unit | (I) | | 48 | −56 | 69 | | 31 |
| | (II) | | 50.5 | −45 | 76 | | 24 |
| | (III) | | 49.5 | −34 | 83 | | 17 |
| | (IV) | | 43 | −28 | 88 | | 12 |
| Butadiene-isoprene copolymer rubber | (a) | 90/10 (parts by weight) | 84 | −23 | | 71.8 | 28.2 |
| | (b) | 75/25 (parts by weight) | 87 | −21 | | 74.8 | 25.2 |
| | (c) | 75/25 (parts by weight) | 58.5 | −37 | | 58.1 | 41.9 |
| | (d) | 75/25 (parts by weight) | 66 | −55 | | 36.7 | 63.3 |
| | (e) | 50/50 (parts by weight) | 54.5 | −17 | | 72.6 | 27.4 |
| | (f) | 25/75 (parts by weight) | 55 | −25 | | 58.1 | 41.9 |
| Polyisoprene rubber | (g) | | 66 | −2 | | 63.5 | 36.5 |
| | (h) | | 47 | −17 | | 54.5 | 45.5 |
| | (i) | | 47 | −26 | | 48.7 | 51.3 |
| | (j) | | 53.5 | −31 | | 44.1 | 55.9 |
| | (k) | | 48 | −49 | | 22.8 | 77.2 |
| Cis-1,4-polyisoprene rubber (*3) | | | 83 | −64 | | | cis 98 |

TABLE 2-continued

| Types of rubber | Composition of copolymer rubber (butadiene/ isoprene) | Mooney viscosity (ML$_{1+4}$, 100° C.) | Tg (*1) (°C.) | Contents of linkages (mole %) (*2) 1,2 | 1,2 + 3,4 | 1,4 |
|---|---|---|---|---|---|---|
| Butadiene-styrene copolymer rubber (*4) | | 53 | −55 | 15 | | 85 |

Note to Table 2
(*1): Measured at a temperature elevating rate of 2.5° C./min. by means of a highly sensitive differential scanning calorimeter (Type SSC/560 manufactured by Daini Seikosha K. K.).
(*2): The 1,2-linkage contents of the polybutadiene and butadiene-styrene copolymer rubber were determined by an infrared spectroscopic method (the Morero method). The linkage contents of the butadiene-isoprene copolymer rubber and polyisoprene rubber [the total (1,2 + 3,4)-linkage contents and the total 1,4(cis + trans)-linkage contents] were determined by H-NMR.
(*3): Nipol IR 2200, a product of Nippon Zeon Co., Ltd.
(*4): Nipol SBR 1502, a product of Nippon Zeon Co., Ltd.

The various properties of the vulcanized products of these compounds were measured, and the results are shown in Table 3.

The mechanical properties were measured in accordance with JIS K-6301.

The rebound at 23° C. was measured by using a Ruepke type rebound tester, and the rebound (R) at 51° C., by using a Dunlop Tripso meter.

The wet skid resistance index (S) was determined by measuring the resistance on a road surface (type B for outdoor use made by 3M Company; black safety walk) defined in ASTM E-303-74 at 19° C. by means of a portable skid tester (Stanley Company), and calculating the index (S) in accordance with the following equation.

$$S = \frac{\text{Wet skid resistance of the vulcanized product}}{\text{Wet skid resistance of the styrene-butadiene copolymer rubber vulcanizate (sample 1 of Table 3)}} \times 100$$

The Pico abrasion index was determined by measuring the amount of wear by means of a Goodrich-type Pico abrasion tester in accordance with ASTM D-2228, and calculating the index in accordance with the following equation.

$$\text{index} = \frac{\text{Amount of Pico abrasion of the styrene-butadiene copolymer vulcanizate (sample 1 of Table 3)}}{\text{Amount of Pico abrasion of the rubber vulcanized product}} \times 100$$

Higher indices mean better properties.

For comparison, Table 3 also shows the properties of vulcanized products of cis-1,4-polyisoprene rubber, styrene-butadiene copolymer rubber and polybutadienes (I) to (IV) having a high 1,2-linkage content, and a vulcanization product of a mixture of the polybutadiene and cis-1,4-polyisoprene rubber.

TABLE 3

| | Sample No. Comparison | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Styrene-butadiene copolymer rubber | 100 | | | | | | | | | | | |
| Cis-1,4-Polyisoprene rubber | | 100 | | 50 | | 50 | | 25 | 50 | 75 | | 50 |
| Polybutadiene having (I) | | | 100 | 50 | | | | | | | | |
| a high 1,2-linkage (II) | | | | | 100 | 50 | | | | | | |
| (III) | | | | | | | 100 | 75 | 50 | 25 | | |
| (IV) | | | | | | | | | | | 100 | 50 |
| Sulfur | 1.75 | 2.0 | 1.0 | 1.5 | 1.0 | 1.5 | 1.0 | 1.25 | 1.5 | 1.75 | 1.0 | 1.5 |
| Vulcanization accelerator | 1.1 | 0.8 | 2.0 | 1.4 | 2.0 | 1.4 | 2.0 | 1.7 | 1.4 | 1.1 | 2.0 | 1.4 |
| Properties of the vulcanizate | | | | | | | | | | | | |
| Rebound (%) at 23° C. (Ruepke-type) | 45 | 54 | 49 | 50 | 43 | 49 | 36 | 43 | 48 | 52 | 31 | 44 |
| at 51° C. (by Dunlop Tripso meter) [R] | 53 | 65 | 55 | 60 | 53 | 59 | 50 | 54 | 58 | 62 | 48 | 57 |
| Wet skid resistance index (19° C.) [S] | 100 | 96 | 100 | 98 | 104 | 101 | 109 | 105 | 104 | 99 | 109 | 105 |
| Pico abrasion index | 100 | 68 | 58 | 61 | 51 | 55 | 51 | 53 | 56 | 60 | 46 | 54 |
| Tensile strength (kg/cm$^2$) | 301 | 326 | 165 | 280 | 156 | 197 | 188 | 201 | 243 | 280 | 159 | 201 |
| Elongation (%) | 480 | 590 | 460 | 540 | 410 | 460 | 400 | 420 | 490 | 520 | 400 | 470 |
| 300% tensile stress (kg/cm$^2$) | 158 | 129 | 93 | 107 | 104 | 111 | 125 | 122 | 123 | 123 | 108 | 115 |
| [(R-53) + (S-100)] | 0 | 8 | 2 | 5 | 4 | 7 | 6 | 6 | 9 | 8 | 4 | 9 |

Table 4 shows the properties of vulcanized products (samples 13 to 23) of butadiene-isoprene copolymer rubbers (a to f) and polyisoprene rubbers (g to k) whose glass transition temperatures are within or outside the scope of this invention, and vulcanized products (samples 24 to 34) of those butadiene-isoprene copolymer rubber/cis-1,4-polyisoprene rubber mixtures and polyisoprene rubber/cis-1,4-polyisoprene rubber mixtures which have a Tg within the scope of this invention but cannot achieve the objects of this invention.

TABLE 4

| Types of rubber and test items | | Sample No. Comparison | | | | | | | | | | |
|---|---|---|---|---|---|---|---|---|---|---|---|---|
| | | 13 | 14 | 15 | 16 | 17 | 18 | 19 | 20 | 21 | 22 | 23 |
| Butadiene-isoprene rubbers | (a) | 100 | | | | | | | | | | |
| | (b) | | 100 | | | | | | | | | |
| | (c) | | | 100 | | | | | | | | |

TABLE 4-continued

| Types of rubber and test items | | | | | | | | | | | | |
|---|---|---|---|---|---|---|---|---|---|---|---|---|
| Polyisoprene rubbers | (d) | | 100 | | | | | | | | | |
| | (e) | | | 100 | | | | | | | | |
| | (f) | | | | 100 | | | | | | | |
| | (g) | | | | | 100 | | | | | | |
| | (h) | | | | | | 100 | | | | | |
| | (i) | | | | | | | 100 | | | | |
| | (j) | | | | | | | | 100 | | | |
| | (k) | | | | | | | | | 100 | | |
| cis-1,4-Polyisoprene rubber | | | | | | | | | | | | |
| Sulfur | | 1.0 | 1.0 | 1.0 | 1.0 | 1.0 | 1.0 | 1.0 | 1.0 | 1.0 | 1.0 | 1.0 |
| Vulcanization accelerator | | 2.0 | 2.0 | 2.0 | 2.0 | 2.0 | 2.0 | 2.0 | 2.0 | 2.0 | 2.0 | 2.0 |
| Properties of the vulcanizate | | | | | | | | | | | | |
| Rebound (%) Ruepke (23°) | | 25 | 23 | 37 | 49 | 12 | 19 | 5 | 9 | 17 | 20 | 40 |
| Dunlop Tripso meter (51° C.) [R] | | 54 | 53 | 53 | 56 | 41 | 40 | 24 | 33 | 42 | 42 | 52 |
| Wet skid resistance index [S] (19° C.) | | 108 | 107 | 107 | 98 | 101 | 109 | 86 | 97 | 111 | 111 | 109 |
| Pico abrasion index | | 47 | 45 | 47 | 65 | 57 | 41 | 72 | 45 | 37 | 36 | 45 |
| Tensile strength (kg/cm²) | | 164 | 170 | 79 | 177 | 208 | 186 | 180 | 187 | 198 | 193 | 157 |
| Elongation (%) | | 380 | 410 | 510 | 500 | 470 | 560 | 540 | 590 | 610 | 630 | 540 |
| 300% Tensile stress (kg/cm²) | | 116 | 110 | 90 | 89 | 122 | 92 | 100 | 89 | 83 | 77 | 74 |
| [(R-53) + (S-100)] | | 9 | 7 | 7 | 1 | −11 | −4 | −43 | −23 | 0 | 0 | 8 |

| Types of rubber and test items | | Sample No. Comparison | | | | | | | | | | |
|---|---|---|---|---|---|---|---|---|---|---|---|---|
| | | 24 | 25 | 26 | 27 | 28 | 29 | 30 | 31 | 32 | 33 | 34 |
| Butadiene-isoprene rubbers | (a) | | | | | | | | | | | |
| | (b) | | | | | | | | | | | |
| | (c) | | | | | | | | | | | |
| | (d) | 75 | | | | | 50 | | | 25 | | |
| | (e) | | 75 | | | | | | | | | |
| | (f) | | | | | | | | | | | |
| Polyisoprene rubbers | (g) | | | 75 | | | | 50 | | | 25 | |
| | (h) | | | | 75 | | | | | | | |
| | (i) | | | | | | | | | | | |
| | (j) | | | | | | | | | | | |
| | (k) | | | | | 75 | | | 50 | | | 25 |
| cis-1,4-Polyisoprene rubber | | 25 | 25 | 25 | 25 | 25 | 50 | 50 | 50 | 75 | 75 | 75 |
| Sulfur | | 1.25 | 1.25 | 1.25 | 1.25 | 1.25 | 1.5 | 1.5 | 1.5 | 1.75 | 1.75 | 1.75 |
| Vulcanization accelerator | | 1.7 | 1.7 | 1.7 | 1.7 | 1.7 | 1.4 | 1.4 | 1.4 | 1.1 | 1.1 | 1.1 |
| Properties of the vulcanizate | | | | | | | | | | | | |
| Rebound (%) Ruepke (23°) | | 51 | 21 | 6 | 16 | 44 | 53 | 12 | 48 | 54 | 27 | 51 |
| Dunlop Tripso meter (51° C.) [R] | | 60 | 50 | 44 | 48 | 56 | 64 | 51 | 59 | 65 | 57 | 62 |
| Wet skid resistance index [S] (19° C.) | | 98 | 108 | 96 | 105 | 105 | 97 | 99 | 100 | 97 | 101 | 98 |
| Pico abrasion index | | 67 | 61 | 89 | 55 | 50 | 71 | 82 | 56 | 60 | 73 | 62 |
| Tensile strength (kg/cm²) | | 209 | 209 | 197 | 205 | 215 | 247 | 207 | 264 | 290 | 242 | 296 |
| Elongation (%) | | 560 | 450 | 490 | 570 | 590 | 580 | 490 | 630 | 580 | 47 | 620 |
| 300% Tensile stress (kg/cm²) | | 88 | 125 | 125 | 97 | 92 | 102 | 135 | 104 | 111 | 143 | 120 |
| [(R-53) + (S-100)] | | 5 | 5 | −13 | 0 | 8 | 8 | −3 | 6 | 9 | 5 | 7 |

Table 5 shows the properties of vulcanized products (samples Nos. 35 to 56) of rubber compositions in accordance with this invention. It is surprising that especially as is seen in samples Nos. 41 and 42, compositions having an excellent balance of high levels of rebound and wet skid resistance represented by an R of 62 and an S of 110 can be obtained.

TABLE 5

| Types of rubber and test items | | Sample No. Invention | | | | | | | | | | |
|---|---|---|---|---|---|---|---|---|---|---|---|---|
| | | 35 | 36 | 37 | 38 | 39 | 40 | 41 | 42 | 43 | 44 | 45 |
| Butadiene-isoprene rubbers | (a) | 75 | | | | | | 50 | | | | |
| | (b) | | 75 | | | | | | 50 | | | |
| | (c) | | | 75 | | | | | | 50 | | |
| | (e) | | | | | | | | | | 50 | |
| | (f) | | | | 75 | | | | | | | 50 |
| Polyisoprene rubbers | (h) | | | | | | | | | | | |
| | (i) | | | | | 75 | | | | | | |
| | (j) | | | | | | 75 | | | | | |
| cis-1,4-Polyisoprene rubber | | 25 | 25 | 25 | 25 | 25 | 25 | 50 | 50 | 50 | 50 | 50 |
| Sulfur | | 1.25 | 1.25 | 1.25 | 1.25 | 1.25 | 1.25 | 1.5 | 1.5 | 1.5 | 1.5 | 1.5 |
| Vulcanization accelerator | | 1.7 | 1.7 | 1.7 | 1.7 | 1.7 | 1.7 | 1.4 | 1.4 | 1.4 | 1.4 | 1.4 |
| Properties of the vulcanizate | | | | | | | | | | | | |
| Rebound (%) Ruepke (23° C.) | | 37 | 34 | 43 | 27 | 26 | 29 | 45 | 44 | 47 | 32 | 35 |
| Dunlop Tripso meter (51° C.) [R] | | 60 | 58 | 59 | 53 | 53 | 52 | 62 | 62 | 62 | 57 | 59 |
| Wet skid resistance index [S] (19° C.) | | 111 | 110 | 106 | 112 | 114 | 111 | 110 | 110 | 103 | 110 | 108 |
| Pico abrasion index | | 50 | 50 | 55 | 47 | 43 | 44 | 58 | 56 | 60 | 58 | 52 |
| Tensile strength (kg/cm²) | | 192 | 184 | 196 | 209 | 219 | 221 | 227 | 225 | 241 | 220 | 230 |
| Elongation (%) | | 490 | 450 | 510 | 550 | 570 | 620 | 530 | 530 | 570 | 460 | 540 |
| 300% Tensile stress (kg/cm²) | | 99 | 113 | 96 | 96 | 102 | 93 | 104 | 105 | 105 | 128 | 116 |

TABLE 5-continued

| [(R-53) + (S-100)] | 18 | 15 | 12 | 12 | 14 | 10 | 19 | 19 | 12 | 14 | 14 |
|---|---|---|---|---|---|---|---|---|---|---|---|

| | | Sample No. Invention | | | | | | | | | |
|---|---|---|---|---|---|---|---|---|---|---|---|
| Types of rubber and test items | | 46 | 47 | 48 | 49 | 50 | 51 | 52 | 53 | 54 | 55 | 56 |

| Types of rubber and test items | | 46 | 47 | 48 | 49 | 50 | 51 | 52 | 53 | 54 | 55 | 56 |
|---|---|---|---|---|---|---|---|---|---|---|---|---|
| Butadiene-isoprene rubbers | (a) | | | | 25 | | | | | | | |
| | (b) | | | | | 25 | | | | | | |
| | (c) | | | | | | 25 | | | | | |
| | (e) | | | | | | | 25 | | | | |
| | (f) | | | | | | | | 25 | | | |
| Polyisoprene rubbers | (h) | 50 | | | | | | | | 25 | | |
| | (i) | | 50 | | | | | | | | 25 | |
| | (j) | | | 50 | | | | | | | | 25 |
| cis-1,4-Polyisoprene rubber | | 50 | 50 | 50 | 75 | 75 | 75 | 75 | 75 | 75 | 75 | 75 |
| Sulfur | | 1.5 | 1.5 | 1.5 | 1.75 | 1.75 | 1.75 | 1.75 | 1.75 | 1.75 | 1.75 | 1.75 |
| Vulcanization accelerator | | 1.4 | 1.4 | 1.4 | 1.1 | 1.1 | 1.1 | 1.1 | 1.1 | 1.1 | 1.1 | 1.1 |
| Properties of the vulcanizate | | | | | | | | | | | | |
| Rebound (%) Ruepke (23° C.) | | 24 | 36 | 38 | 50 | 50 | 51 | 44 | 46 | 37 | 46 | 46 |
| Dunlop Tripso meter (51° C.) [R] | | 56 | 59 | 59 | 64 | 64 | 64 | 62 | 62 | 62 | 61 | 62 |
| Wet skid resistance index [S] (19° C.) | | 108 | 112 | 107 | 105 | 105 | 100 | 103 | 104 | 103 | 105 | 102 |
| Pico abrasion index | | 58 | 48 | 51 | 64 | 62 | 65 | 63 | 58 | 62 | 54 | 59 |
| Tensile strength (kg/cm$^2$) | | 211 | 234 | 239 | 272 | 270 | 268 | 263 | 262 | 234 | 261 | 275 |
| Elongation (%) | | 500 | 540 | 560 | 560 | 560 | 580 | 510 | 530 | 480 | 520 | 540 |
| 300% Tensile stress (kg/cm$^2$) | | 121 | 117 | 112 | 106 | 115 | 108 | 131 | 130 | 132 | 129 | 129 |
| [(R-53) + (S-100)] | | 11 | 18 | 13 | 16 | 16 | 11 | 12 | 13 | 12 | 13 | 11 |

What we claim is:

1. A rubber composition comprising as main components (1) 25 to 75% by weight of at least one essentially amorphous rubber having a glass transition temperature of from −45° C. to 0° C., a Mooney viscosity (ML$_{1+4}$, 100° C.) of 20-200 and 1,2-linkages, 3,4-linkages or both 1,2- and 3,4-linkages and selected from the group consisting of an isoprene-butadiene copolymer rubber, polyisoprene rubber and mixtures thereof and (2) 75 to 25% by weight of at least one rubber selected from the group consisting of natural rubber; cis-1,4-polyisoprene rubber having a cis-1,4-linkage content and mixture thereof of at least 90 mole%, said composition having a value, defined by the following formula, of at least 10, $$((R-53)+(S-100))$$

wherein R is a rebound (%) measured at 51° C. by a Dunlop Tripso meter for vulcanized product of said rubber composition, and a wet skid resistance index S which is determined at 19° C. by a portable skid tester for a vulcanized product of said rubber composition on a road surface defined by ASTM E-303-74.

2. The rubber composition of claim 1 wherein the rubber (1) has a glass transition temperature of from −40° C. to −15° C.

3. The rubber composition of claim 1 or 2 wherein the essentially amorphous rubber component (1) comprises the isoprene-butadiene copolymer rubber wherein the isoprene unit content of the isoprene-butadiene copolymer rubber is at least 5% by weight.

4. The rubber composition of claim 3 wherein the isoprene unit content of the isoprene-butadiene copolymer rubber is at least 10% by weight.

5. The rubber composition of claim 1 or 2 wherein the rubber (1) has a Mooney viscosity (ML$_{1+4}$, 100° C.) of 30 to 150.

6. The rubber composition of claim 1 wherein the essentially amorphous rubber component (1) comprises polyisoprene rubber.

7. The rubber composition of claim 1 wherein the essentially amorphous rubber component (1) is a mixture of the isoprene-butadiene copolymer rubber and polyisoprene rubber.

8. The rubber composition of claim 1 wherein the rubber component (2) is natural rubber.

9. The rubber composition of claim 1 wherein the rubber component (2) is cis-1,4-polyisoprene rubber.

10. The rubber composition of claim 1 wherein the rubber component (2) is a mixture of natural rubber and cis-1,4-polyisoprene rubber.